United States Patent
Boerhout

(10) Patent No.: US 7,289,919 B2
(45) Date of Patent: Oct. 30, 2007

(54) CYCLIC TIME AVERAGING FOR MACHINE MONITORING

(75) Inventor: Johannes I. Boerhout, San Diego, CA (US)

(73) Assignee: SKF Condition Monitoring Inc., San Diego, CA (US)

( * ) Notice: Subject to any disclaimer, the term of this patent is extended or adjusted under 35 U.S.C. 154(b) by 0 days.

(21) Appl. No.: 10/903,949

(22) Filed: Jul. 30, 2004

(65) Prior Publication Data

US 2005/0021250 A1 Jan. 27, 2005

Related U.S. Application Data

(63) Continuation of application No. 10/313,766, filed on Dec. 4, 2002, now Pat. No. 6,789,025.

(60) Provisional application No. 60/336,807, filed on Dec. 4, 2001.

(51) Int. Cl.
*G01L 7/00* (2006.01)

(52) U.S. Cl. ............... 702/56; 73/660; 162/198; 702/35; 702/43

(58) Field of Classification Search ........... 702/34, 702/35, 36, 39, 43, 56, 85, 86–94, 183–185; 700/280; 318/611; 73/660; 162/198
See application file for complete search history.

(56) References Cited

U.S. PATENT DOCUMENTS

| | | | |
|---|---|---|---|
| 4,422,333 A | 12/1983 | Leon | |
| 4,931,949 A | 6/1990 | Hernandez et al. | 702/35 |
| 5,233,540 A * | 8/1993 | Andersson et al. | 700/280 |
| 5,311,446 A * | 5/1994 | Ross et al. | 700/280 |
| 5,471,880 A * | 12/1995 | Lang et al. | 73/660 |
| 5,943,634 A | 8/1999 | Piety et al. | 702/56 |
| 6,270,628 B1 * | 8/2001 | Suomi et al. | 162/198 |
| 6,298,725 B1 | 10/2001 | Forrester | |
| 6,421,615 B1 | 7/2002 | Nakajima et al. | 702/43 |
| 6,484,109 B1 | 11/2002 | Lofall | 702/56 |
| 6,507,165 B2 * | 1/2003 | Kato et al. | 318/611 |
| 6,549,869 B1 | 4/2003 | Piety et al. | 702/122 |
| 6,633,822 B2 | 10/2003 | Maness et al. | 702/56 |
| 7,099,782 B2 * | 8/2006 | Hitchcock et al. | 702/56 |

FOREIGN PATENT DOCUMENTS

EP    1 077 372 A2    2/2001
WO    WO 03/006935 A1    1/2003

OTHER PUBLICATIONS

Abstract, Lembregts et al., "Off-line Synchronous Resampling of Vibration Measurements", LMS International NV, pp. 748-755 (1996).

* cited by examiner

*Primary Examiner*—John Barlow
*Assistant Examiner*—John Le
(74) *Attorney, Agent, or Firm*—Knobbe Martens Olson & Bear LLP

(57) ABSTRACT

A cyclic time averaging method is directed at processing time-domain vibration data of the machine to produce an averaged time waveform over a selected cyclic time period. It is not necessary to employ a triggering signal to obtain the averaged time waveform.

2 Claims, 4 Drawing Sheets

CYCLIC TIME AVERAGING FOR MACHINE MONITORING

RELATED APPLICATIONS

This patent application is a continuation of U.S. application Ser. No. 10/313,766, filed Dec. 4, 2002, now U.S. Pat. No. 6,789,025, which claims priority to, and incorporates herein by reference, U.S. Provisional Patent Application 60/336,807, titled "CYCLIC TIME AVERAGING FOR MACHINE MONITORING," filed Dec. 4, 2001.

BACKGROUND OF THE INVENTION

1. Field of the Invention

The invention generally relates to systems and methods for monitoring the condition of a machine. More particularly, the invention concerns systems and methods for analysis of machine vibration signals to detect and evaluate specific sources of energy contribution to the vibration energy of the machine.

2. Description of the Related Art

It is common for industrial and commercial facilities to operate a large number of machines concurrently, many of which may cooperate in a large interdependent process or system. Despite increasingly efficient maintenance programs, at any time some percentage of the machines develop defects that are likely to lead to machine failure. For example, machines having moving parts (e.g., bearings) experience constant friction that results in wear. It is known that bearing failures are a major cause of motor faults. Bearing damage due to wear may not be apparent, however, absent gross damage or failure of the motor because the bearing's wear site is likely concealed in the motor's assembled state.

Consequently, the use of machine condition monitoring systems has become essential to preventive maintenance of industrial machinery in order to avoid down time or catastrophic failure of machines. Unscheduled plant shutdowns can result in considerable financial losses. Failure of high performance machinery can lead to fatal injury and processing system backup. Typical benefits from a preventive maintenance program include longer periods between machinery shutdowns, evaluation of the condition of machine components without resorting to costly and/or destructive disassembly for visual inspection, and prolonging the machinery's operational life by taking corrective action when developing faults are identified early.

Measurement and analysis of machine vibrations typically includes sensing the machine's vibrations with a transducer that converts the vibration information to electrical signals. The electrical signals are processed so that a history of vibration amplitude over time can be obtained. Data points representing amplitude at a certain point in time may be plotted on a graph of amplitude versus time. This graph is often referred to as the time-domain vibration signature of the machine. FIG. 1 shows an exemplary graph of time-domain vibration data. FIG. 1 is a plot of measured acceleration of a point of a machine assembly over a period of about eight seconds. The particular machine from which this data was measured was rotating at 104.98 rpm, so FIG. 1 shows data over the course of about 15 revolutions. Peak values measured were about 0.025 g.

Rotating and reciprocating components of a machine produce vibrations having a wide range of frequencies. In addition to the time-domain data representation of machine vibrations, the vibrations of a machine, machine component, or other phenomena acting on the machine may be characterized by a plot of vibration energy as a function of vibration frequency. This diagram is commonly referred to as a "frequency spectrum," "spectral diagram," or "spectrum plot." FIG. 2 shows an exemplary frequency spectrum, which was derived from the time-domain vibration data of FIG. 1. Although the frequency scale is not illustrated in FIG. 2, prominent peaks are seen at about 10-11 Hz (designated as peak 10) and about 87 Hz (designated as peak 20).

Sometimes it is useful to derive a "profile plot" of the vibration data. FIG. 3 shows an exemplary profile plot derived from one revolution of the machine rotor shaft. The data of FIG. 3 corresponds to about the first 0.57 seconds of the time-domain vibration data of FIG. 1, which is the time for one revolution at 104.98 rpm. In a profile plot, the measured acceleration is plotted as the radial distance from a selected angular location on a circle 350 which represents one revolution of the machine rotor. Conventionally, a machine shaft orientation of zero degrees corresponds to the top of the circle 350. Thus, a profile plot provides a visual representation of the measured acceleration (or velocity, or displacement as may be desired) as a function of the position of the rotating machine shaft or other periodic event associated with the machine.

The frequencies and associated peaks of the vibrations of a specific machine collectively make up the "frequency spectrum" for the machine, also known as the machine's "vibration signature." A machine's vibration signature varies with, for example, the design, manufacture, application, and wear of its components. The machine's normal operating conditions determine the amplitude of steady (or "normal") vibration. It is a common practice to obtain a reference frequency spectrum when the machine is known to be in good condition for comparison against future measurements of the machine's frequency spectrum. Such comparison aids in detecting changes in the condition of the machine or its subcomponents. Hence, analysis of a machine's vibration signature provides valuable insights into the condition of the machine.

A technique known as synchronous time averaging ("STA") has been utilized to detect the "fault energy" contribution of a periodic signal as a means to troubleshoot product quality problems on machinery, such as for example a paper machine. STA is also commonly utilized by data acquisition systems to boost the signal to noise ratio. STA extracts from the time-domain data those signals that are repetitive and synchronized to a physical event, e.g., the rotation of a shaft. Upon the reception of a trigger signal, the data acquisition system acquires N samples at a predetermined sampling frequency $F_S$. Hence, the total time for one measurement is $T=N/F_S$. Upon the next trigger event, the system acquires and stores another N samples. Using STA, the system then averages the two data sets, on a corresponding sample-by-sample basis, that is, the first sample from the first N samples is averaged with the first sample from the second set of N samples, and so on. This averaging results in a derived time-domain waveform of N averaged data points. The system may in a similar fashion acquire more than two sets of N samples and use STA to produce the averaged waveform. Thus, the total time required for acquiring the data for processing with STA is $(N/F_S)*A$, with A being the number of sets included in the averaging.

STA suppresses noise random to the signal synchronized to the trigger event because the noise component of the signal averages out after the system acquires and averages multiple data sets. The periodic signal does not average out because the system acquires the data based on the trigger and thereby starts collection of the N samples in synchronization with the periodicity of the physical event.

By way of example, to apply STA to signals from a machine having a rotating shaft, typically the shaft is configured to provide for a once-per-revolution signal that occurs every time the shaft is in a particular position. Another example is a belt and pulley system. To apply STA to signals from the belt, a trigger provides a once-per-revolution signal that occurs every time the belt is in a particular position. The physical location of the trigger is not critical, as long as it remains constant over each data acquisition cycle. In the context of the profile plot of FIG. 3, for example, the trigger event may correspond to the top of the circle 350. Thus, in these conventional systems, if it is desired to compute STA measurements for shaft related phenomena as well as belt related phenomena using the same sensor to see how each (i.e., the shaft and the belt) phenomenon contribute to the vibration at the point of the sensor, it is typically required to perform two different STA measurements, each with its own set of averages and each with its own trigger.

Notwithstanding the several methods available for component defect detection and/or fault energy contribution by analysis of a machine's frequency spectrum or time-domain data, there is a continuing need in the industry for systems and methods that define current condition of the machine and predict safe operating life accurately relying on the fewest measurements and incurring the least cost.

SUMMARY OF THE INVENTION

The methods and systems of the invention have several aspects, no single one of which is solely responsible for its desirable attributes. Without limiting the scope of this invention as expressed by the claims which follow, its more prominent features will now be discussed briefly.

One aspect of the invention concerns a method of monitoring the condition of a machine. The method comprises receiving a set of N sampled vibration amplitude values taken at a corresponding set of discrete times during operation of the machine. The method further comprises deriving a set of n averaged amplitude data points, with n being less than N, wherein each of the n averaged amplitude points comprises an average of vibration amplitudes separated by a period M, and wherein at least some of the vibration amplitudes used in deriving the set of n averaged amplitude data points do not correspond to any of the N sample values.

Another feature of the invention is directed to a method of monitoring the condition of a machine. The method comprises generating a time-series vibration amplitude data set comprising N data points over a time period greater than a time period M without re-triggering data acquisition during the acquisition of said N points. The method further comprises deriving n averaged data points, wherein each of the n points is representative of average amplitudes for points of the time-series data separated in time by said period M.

In one embodiment, the invention concerns a system for monitoring the condition of a machine. The system comprises a data storage module that receives and stores N sampled vibration amplitude values taken at a corresponding set of discrete times spanning a period of operation of the machine. The system further comprises a data analyzer module, which is in communication with said data storage module. The data analyzer module is configured to derive from said N values a set of n averaged amplitude data points, wherein (a) n is less than N, (b) each of said n points comprises an average of vibration amplitudes separated by a period M, and (c) at least some of the amplitudes used to derive said set of n points do not correspond to any of said N values.

Another feature of the invention is directed to a system for monitoring the condition of a machine. The system comprises a data acquisition module configured to generate a time-series vibration amplitude data set. The time-series data set comprises N data points over a time period greater than a time period M. The data acquisition module is configured to generate said N data points independently of a repeating synchronizing trigger signal. The system further comprises a data analyzer module configured to derive n averaged data points, wherein each of said n points is representative of average amplitudes for points of said time-series data separated in time by M.

Yet another aspect of the invention relates to a system for monitoring the condition of a machine. The system comprises a data storage module that receives and stores time-series data. The time series data comprises N sampled vibration amplitude values with corresponding times, wherein said time-series data spans a period of operation of the machine. The system further comprises a data analyzer module, which is in communication with said data storage module, configured to derive from said N values a set of n averaged amplitude data points. The data analyzer module derives the n data points such that n is less than N, each of said n points comprises an average of vibration amplitudes separated by a period M, and at least some of the amplitudes used to derive the n points are estimated from interpolation between at least one pair of said N values.

BRIEF DESCRIPTION OF THE DRAWINGS

The above and other aspects, features, and advantages of the invention will be better understood by referring to the following detailed description, which should be read in conjunction with the accompanying drawings, in which.

DETAILED DESCRIPTION OF CERTAIN INVENTIVE EMBODIMENTS

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

In general terms, embodiments of the invention concern a cyclic time averaging ("CTA") method and a related system for deriving an averaged waveform suitable for a profile plot display (see FIG. 6), which depicts energy contributions using time-domain data in a circular diagram limited to one period of the phenomenon under consideration. In some embodiments, CTA uses a time waveform as acquired by a data acquisition system and produces an averaged waveform as if multiple STA data sets were acquired and averaged by the data acquisition system. CTA is useful in "contribution analysis," i.e., a technique that enables the allocation of vibration energy to particular sources in a complex signal.

Figure 1:
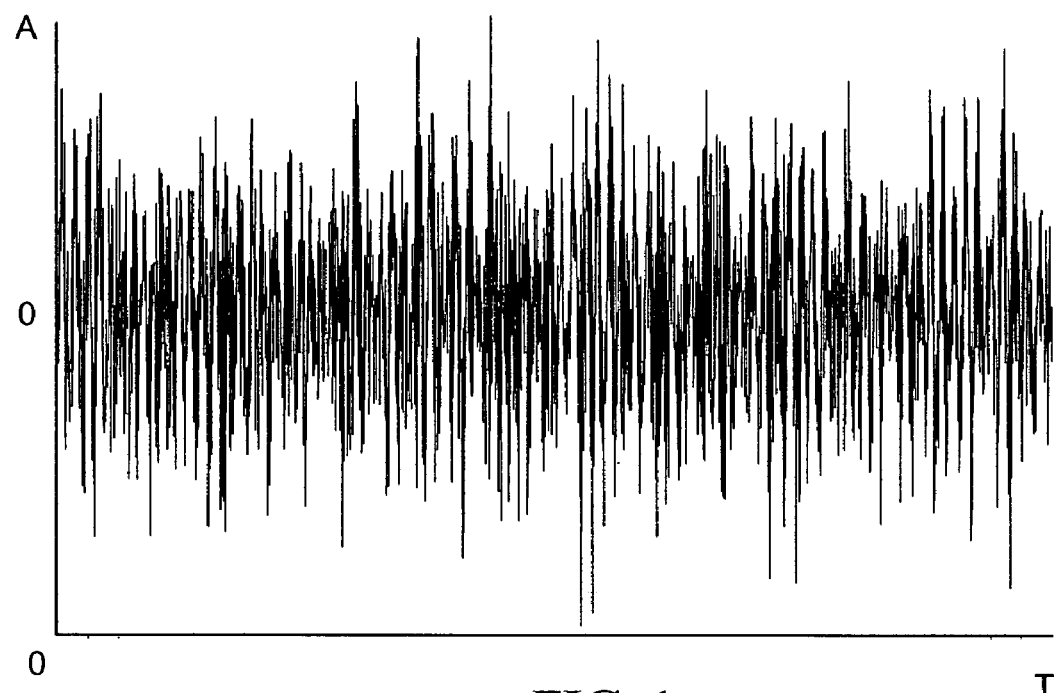
FIG. 1 is a graph of a machine's time-domain vibration data before processing with the systems and methods of the invention.
Figure 2:
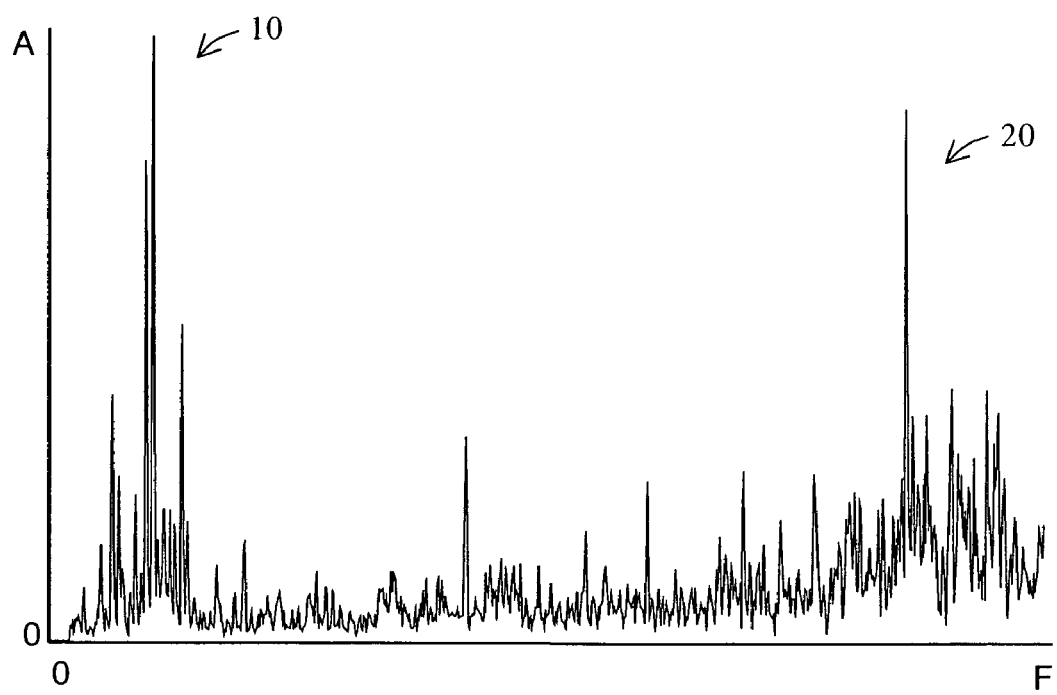
FIG. 2 is a graph of the frequency spectrum of the time-domain data of FIG. 1.
Figure 3:
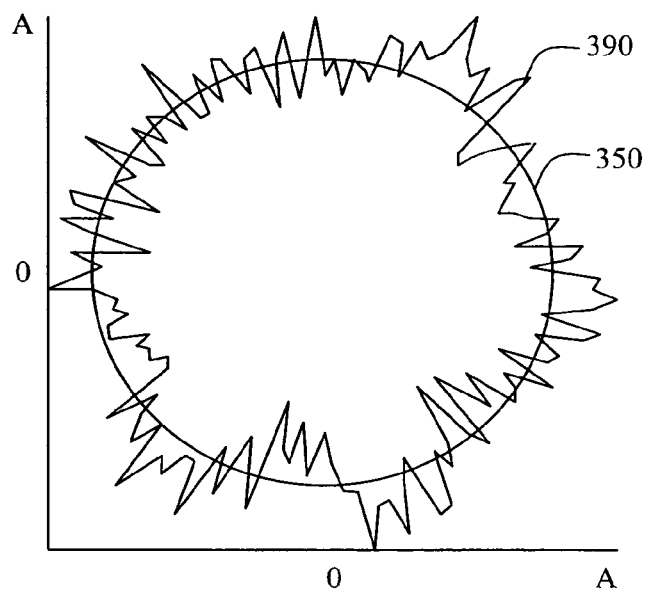
FIG. 3 is a profile plot of a portion of the time-domain data shown in FIG. 1.

As already stated above, FIGS. 1, 2 and 3 illustrate conventional presentations of the vibration signature of a machine in the time-domain (FIG. 1), frequency spectrum or "frequency domain" (FIG. 2), and a profile plot (FIG. 3). A system 100, as described below with reference to FIG. 4, employs the CTA method to process the machine's time-domain vibration data to produce a profile plot and an "energy contribution" graph, as shown respectively in FIG. 6 and FIG. 7.

Figure 4:
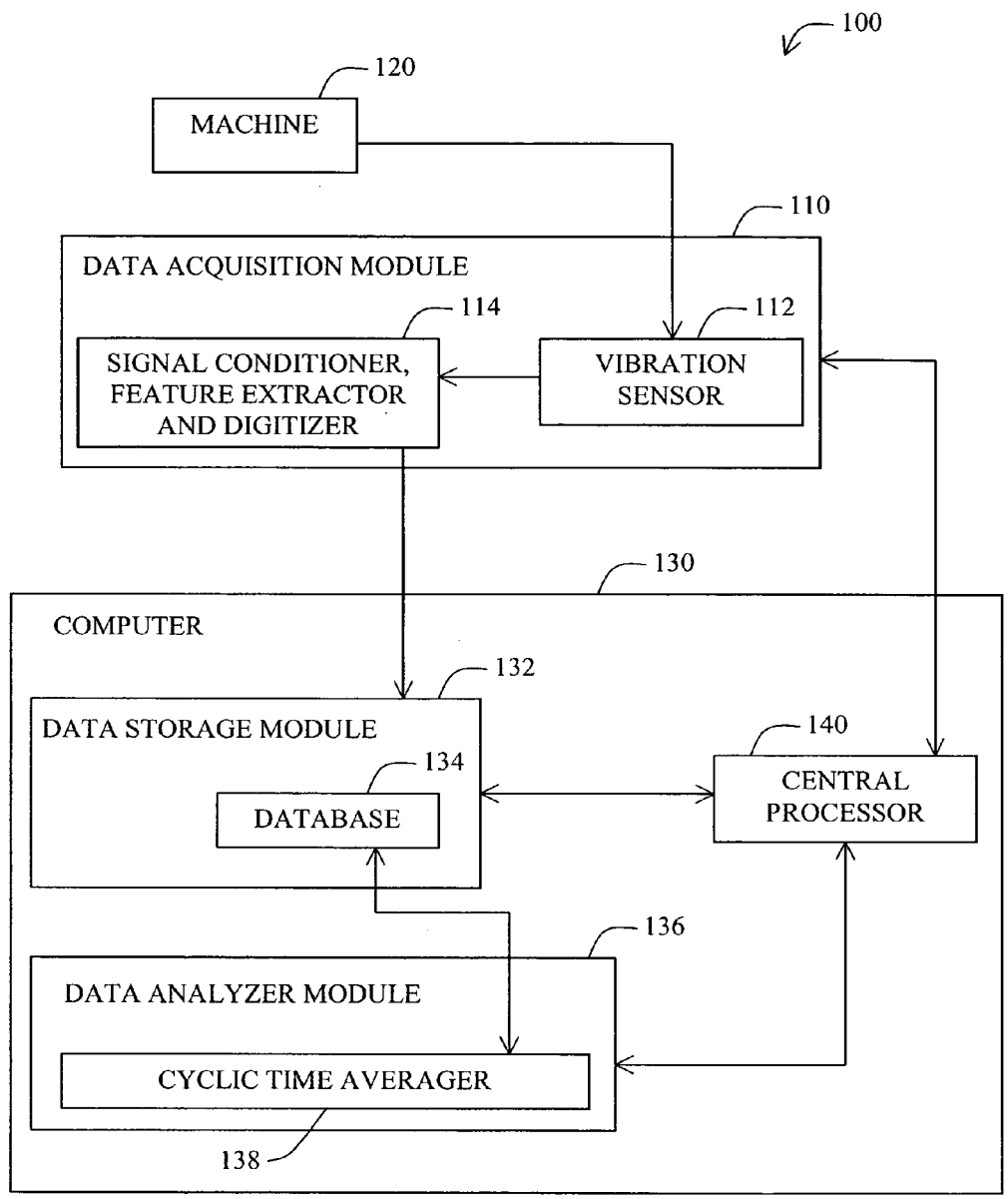
FIG. 4 is a block diagram of an exemplary system in accordance with the invention for energy contribution detection through cyclic time averaging.

FIG. 4 illustrates a system 100 for monitoring the condition of a machine in accordance with one embodiment of the invention. The system 100 consists of a data acquisition module 110 in communication with a computer 130. The data acquisition module 110 is coupled to a machine 120 for detecting vibrations of the machine 120. The data acquisition module 110 transmits the vibration data to the computer 130, which analyzes the vibration data to evaluate energy contributions by, for example, a faulty component (not shown) of the machine 120.

In some embodiments, the data acquisition module 110 comprises a vibration sensor 112 that is coupled to the machine 120 to detect vibrations of the machine 120. The vibration sensor 112 is typically configured to measure one or more of the three basic parameters of vibrations, namely displacement (i.e., amplitude), velocity, and acceleration. Typically, the vibration sensor 112 converts the motion of the vibrating machine 120 into electrical signals. These vibration sensing devices and their use are well known by persons of ordinary skill in the relevant technology.

The data acquisition module 110 may also comprise a signal conditioner, feature extractor and digitizer 114. The vibration sensor 112 transmits the vibration signals to a signal conditioner and digitizer 114 that consists of electrical circuits for conditioning (e.g., amplifying and/or filtering), extracting features, and digitizing the vibrations signals. Device 114 may be configured to perform analog post processing to enhance certain features of the signal before digitizing. For example, the device 114 may use acceleration enveloping to enhance repetitive signals. The electrical circuits of the signal conditioner, feature extractor and digitizer 114 are well known in the relevant technology.

The computer 130 may be any computing device that is configured to receive, store, and analyze the vibration data transmitted to the computer 130 by the data acquisition module 110. The computer 130 may be, for example, a server computer, a personal computer, a portable computer, a handheld computer, or a personal digital assistant, etc.

The computer 130 comprises a data storage module 132 in communication with a data analyzer module 136. The data storage module 132 may be any nonvolatile memory storage device, such as a hard drive, magnetic tape, etc. The data storage module 132 has one or more databases 134 for storing the data provided by the signal conditioner and digitizer 114. The database 134 may be a data storage structure in the form of a list, table, or relational database, as is well known in the relevant technology.

The computer 130 also comprises a central processor 140 that is in communication with the data storage module 132 and the data analyzer module 136. The central processor 140 coordinates communications between the data analyzer module 136 and the data storage module 132, and generally aids in the processing of data.

The data analyzer module 136 consists of one or more software/hardware or firmware components for analyzing the vibration data of the machine 120 to produce visual displays of the data which assist machine maintenance personnel in identifying and correcting machine operational problems or defects. In other embodiments, the data analyzer module 136 process the time-domain vibration data of a machine and identifies energy contributions from different periodic phenomena associated with the machine 120. The data analyzer module 136 comprises a cyclic time averager 138 ("averager 138") that analyzes the vibration data (i.e., the time-domain signals of the vibrations of the machine 120) to produce a value indicative of, for example, the energy contribution to the machine's vibrations by a component of the machine. The operation and use of the averager 138 will be described in further detail below with reference to FIGS. 5-8.

It should be understood that the structure of the system 100 as depicted in FIG. 4 is only exemplary of one system in accordance with the invention. More particularly, it will be apparent to a person of ordinary skill in the relevant technology that that the data acquisition module 110 and the computer 130 need not be two separate devices. That is, in some embodiments the data acquisition module 110 module may be integral with (i.e., be a part of, or located in) the computer 130. Conversely, it is not necessary that any of the components of the system 100 be commonly housed or in each other's vicinity. For example, the vibration sensor 112 may be attached to the machine 120 and remotely located from the signal conditioner and digitizer 114. In such a case, the vibration sensor 112 may transmit the vibration data to the signal conditioner and digitizer 114 via wireless communication, for example. Similarly, the data storage module 132, data analyzer module 136, and central processor 140 may communicate via wireless or hard-wired channels, and may be located remotely from each other. Moreover, it will be readily recognized by the person of ordinary skill in the relevant technology that the system 100 may comprehend multiple vibration sensors 112 on multiple machines 120 providing vibration data to one or more computers 130.

A typical use of the system 100 will now be described. The vibration sensor 112 collects vibration data from a machine 120. The vibration sensor may comprise a piezoelectric crystal which has an electrical output that depends on the acceleration experienced by the crystal. The vibration sensor 112 transmits the vibration data to the signal conditioner and digitizer 114. The signal conditioner and digitizer 114 may, for example, amplify the electrical signals and filter out noise. Preferably, the signal conditioner and digitizer 114 also digitizes the electrical signals for communication to the computer 130. The signal conditioner and digitizer may also transform raw acceleration measurements to velocity or displacement data as well. Advantageously, although data acquisition may be initiated by some trigger signal or other event, the data acquisition process may proceed from such an event without being re-triggered periodically by a signal generated by a specific machine component position such as a shaft or belt orientation.

The computer 130 receives the vibration data from the data acquisition module 110 for further processing. The computer 130 stores the vibration data, e.g., the time domain response, in the database 134. The data analyzer module 136, in cooperation with the central processor 140, retrieves the vibration data from the data storage module 132 for analysis by the averager 138. The computer 130 may further evaluate the time-domain response of the machine 120 to determine the energy contribution of a component of the machine to the overall vibration energy of the machine. As will be described in additional detail below, the averager 128 may produce a time averaged time-domain vibration signal which is averaged over a user defined period M.

Figure 6:
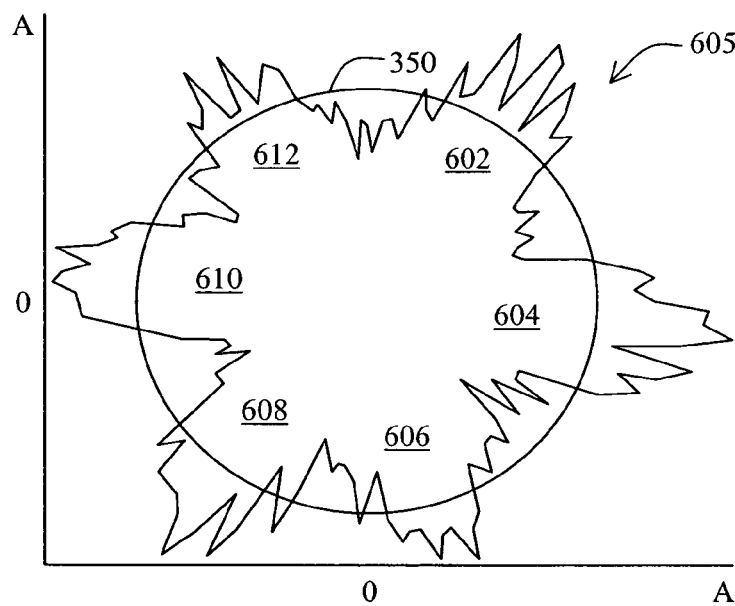
FIG. 6 is a profile plot of the time-data shown in FIG. 1 after processing with an exemplary system and method of the invention.
Figure 5:
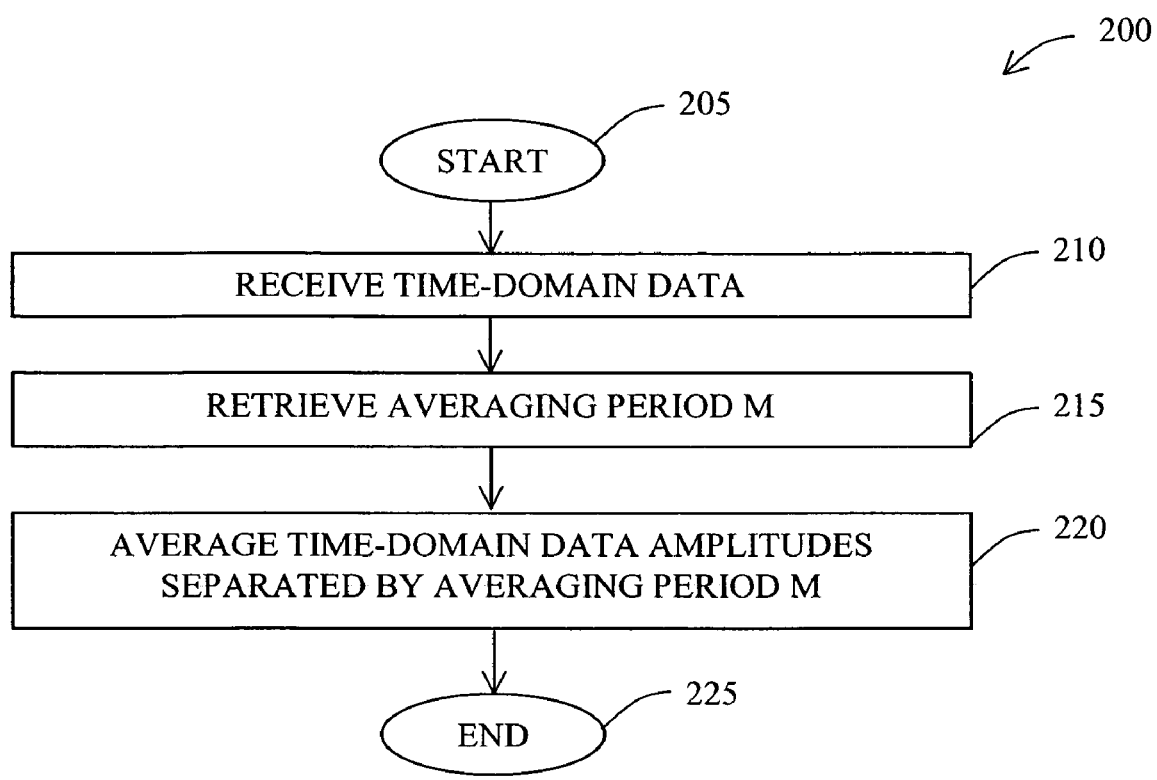
FIG. 5 is a flowchart of an exemplary process of energy contribution detection through cyclic time averaging in accordance with the invention.

FIG. 5 is a flowchart of a process 200 of deriving an averaged time waveform for use in a profile plot such as shown in FIG. 6. The process 200 starts at a state 205. The process 200 next proceeds to a state 210 wherein the system data analyzer module 136 receives N time-domain vibration amplitude data points for the machine 120, separated by a sampling interval of $1/F_S$. As mentioned above, the data is advantageously acquired without having data acquisition re-triggered periodically by a signal generated by a specific machine component position such as a shaft or belt orientation. Alternatively, of course, the data analyzer module 136 may receive a previously produced frequency spectrum data set which can be converted to a time-domain data set of N points through well known techniques.

In many cases, the set of N time-domain data points has already been acquired or produced and is stored in the system 100; however, the inventive method can also be used as data is continuously acquired on a point by point basis if desired. The process 200 continues to a state 215, wherein the system 100 retrieves or accepts a time period M that is used to average the time-domain data. M may be user selected, and may be based on the known period of a phenomenon associated with the machine 120. For example, M may be the rotational period of a shaft of a motor driven pump, or M may be the period of rotation of a roller in a paper processing machine. In preferred embodiments, M is the known period of a certain cyclic phenomenon that correlates to the vibrations of the machine 120. Although it is not absolutely necessary, M is preferably less than one-half of the length of time spanned by the N samples at a sampling frequency of $F_S$.

The process 200 next proceeds to a state 220 wherein the averager 138 uses a novel averaging algorithm to produce an averaged time domain waveform from the N data points of time-domain vibration data from the machine 120. The averager 138 calculates the average of samples of the time-domain data that are separated by integer multiples of the selected length of time M. That is, the averager 138 averages a first sample j from the N samples, taken at time $T_j$ with the measured or estimated vibration amplitude value at time $T_j+M$, $T_j+2M$, $T_j+3M$, and so on for the length of time spanned by the N sampled values.

It is one advantageous aspect of the system that the time period M need not correspond to an integer number of sample periods, each of which equals $1/F_S$. Thus, in some cases, the time M may correspond to an exact number n of sample periods, where n is an integer. In this case, a given sample p will be averaged with samples p+n, p+2n, p+3n, and so on. In other cases, where M is such that a whole number of sample periods do not correspond to the time frame represented by M, such that M is equal to n+α sample periods, where α is a number between 0 and 1, the averager 138 averages a given sample p with the amplitude of the waveform at times corresponding to p+(n+α), p+2(n+α), p+3(n+α), and so on. However, because there are no measured samples at these times, it is advantageous to estimate the amplitude at these times by interpolating between samples in order to obtain an accurate average. For example, if n+α is 155.5, the averager 138 averages the first sample with an interpolated value halfway between samples 156 and 157, sample 312, the interpolated value halfway between samples 467 and 468, sample 623, and so on. Similarly, toward the end of the time period M, sample 156 would be averaged with an interpolated value halfway between samples 311 and 312, sample 467, the interpolated value halfway between samples 622 and 623, sample 778, and so on. In this manner, the averager 138 produces 156 averaged samples representative of one cyclic time period M. The averager 138 may be configured to employ any suitable interpolation algorithm, including linear or B-spline interpolation.

The averager 138 produces an averaged waveform comprising about n averaged values that describes the energy content produced by a phenomenon in synchronization with the period M. After averaging the time-domain data at the state 220, the process 200 ends at a state 225.

The result of applying CTA to the time-domain data set of FIG. 1, in accordance with the methods described above for example, is depicted in the profile plot of FIG. 6. The time waveform 600 reveals six peaks, namely features 602, 604, 606, 608, 610, and 612 of waveform per cycle. For this plot, the period M equaled the period of rotation of the roll shaft of a paper processing machine (104.98 Hz in this example), with the averaging performed over about 14 revolutions. In contrast, the profile plot of FIG. 3 is for one revolution only. A comparison of the FIG. 6 plot with the FIG. 3 plot shows how the energy at 10-11 Hz illustrated in the spectrum plot of FIG. 2 is masked by noise over one revolution, but that the CTA averaging technique described above successfully pulls this signal out of the noise over several revolutions. The additional contribution at 87 Hz (peak 20 of FIG. 2) is visible as the jagged subpeaks on top of the six longer period peaks in FIG. 6.

Figure 7:
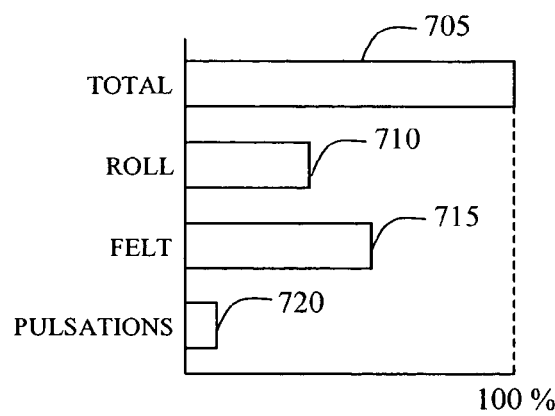
FIG. 7 is a diagram showing the percent of energy contribution of different phenomena related to a monitored machine. The data for this diagram was obtained in part through the use of the method shown in FIG. 5.

It will be appreciated that CTA processed time-domain data may also be used to generate an "energy contribution" or "fault contribution" graph as depicted in FIG. 7. By utilizing different values for M, vibration energy associated with different sources can be separated from one another. The horizontal dimension of FIG. 7 measures percent energy contribution, and the vertical dimension presents various energy contribution phenomena. In particular, the graph of FIG. 7 shows the total vibration energy 705 of the paper processing machine used to take the data of FIGS. 1-3, which of course would measure 100% on the horizontal dimension of FIG. 7. The percent energy contribution of the roller is represented by the bar 710, that of the felt by the bar 715, and that of periodic pulsations are represented by bar 720. These percentages are derived from analyzing the time-domain data of the vibration of the machine 120 using the specific periods of associated with each of the roller, felt, and pulsation phenomena. The averaging method can thus be used to process the same data set using different values for M, thereby removing the need to produce different data sets which were collected by periodically re-triggering data acquisition in response to some component of the machine 120.

Without intending to limit the scope of the invention as defined by the claims, the following observations are made in relation to the use of CTA to analyze time-domain vibration data. When the averaging period M is indicative of the period of rotation of main machine component, for example a power shaft, the accuracy of CTA for separating "fault components" embedded in the machine's vibration signature is determined in part by one or more of the following factors: the accuracy in measurement of the speed of the shaft, accuracy of the ratio of the speed of the shaft to the fault component speed; the relation between the number of data samples N and the sampling frequency $F_S$, preferably $N\div(2.56F_S) \geqq 10M$; and the variability of the harmonic phase of the fault component's signal, wherein a fixed phase relationship of the harmonic series contributes to more accurate CTA.

It should also be noted that the system 100 does not require use of a periodic trigger signal since CTA does not depend on synchronization of the time-domain vibration data with a trigger signal. This is to be contrasted with STA which requires an external triggering device for each "fault component" under analysis. As has been explained above, CTA not only obviates the need for multiple triggers, but it also reduces measurement time and provides flexibility in analyzing the acquired data.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A system for analyzing vibration data, said system comprising:

an input port configured to receive a plurality of vibration amplitude samples taken at discrete sampling times, wherein said vibration amplitude samples are taken from a machine having a characteristic repeated cyclic phenomena recurring over a period M;

a first module configured to estimate vibration amplitudes at times between said discrete sampling times, wherein said first module comprises an interpolator; and a second module configured to use said estimated vibration amplitudes in performing a cyclic average, wherein adjacent discrete sampling times are separated by a time period of $1/F_S$, where $F_S$ is a sampling frequency, and wherein period $M=(n+\alpha)/F_S$, wherein n is an integer, and $\alpha$ is a number between 0 and 1.

2. A system for analyzing vibration data, said system comprising:

an input port configured to receive a plurality of vibration amplitude samples taken at discrete sampling times, wherein said vibration amplitude samples are taken from a machine having a characteristic repeated cyclic phenomena recurring over a period M;

a first module configured to estimate vibration amplitudes at times between said discrete sampling times, wherein said first module comprises an interpolator; and a second module configured to use said estimated vibration amplitudes in performing a cyclic average, wherein said second module comprises an averager configured to produce an average vibration amplitude by computing the average of a first sampled value at time p and the sampled or interpolated vibration amplitude value at one or more later times $p+m(n+\alpha)$, where m is an integer, n is an integer, and $\alpha$ is a number between 0 and 1.

* * * * *